(12) United States Patent
Myers et al.

(10) Patent No.: US 10,508,812 B2
(45) Date of Patent: Dec. 17, 2019

(54) PRE-FILM LIQUID FUEL CARTRIDGE

(71) Applicant: General Electric Company, Schenectady, NY (US)

(72) Inventors: Geoffrey David Myers, Simpsonville, SC (US); Borys Borysovych Shershnyov, Moscow (RU); Alexey Yurievich Gerasimov, Moscow (RU)

(73) Assignee: General Electric Company, Schenectady, NY (US)

( * ) Notice: Subject to any disclaimer, the term of this patent is extended or adjusted under 35 U.S.C. 154(b) by 383 days.

(21) Appl. No.: 15/303,544

(22) PCT Filed: May 12, 2014

(86) PCT No.: PCT/RU2014/000333
§ 371 (c)(1),
(2) Date: Oct. 12, 2016

(87) PCT Pub. No.: WO2015/174880
PCT Pub. Date: Nov. 19, 2015

(65) Prior Publication Data
US 2017/0038074 A1 Feb. 9, 2017

(51) Int. Cl.
*F23R 3/28* (2006.01)
*F23R 3/34* (2006.01)

(52) U.S. Cl.
CPC .............. *F23R 3/286* (2013.01); *F23R 3/343* (2013.01); *F23D 2900/11101* (2013.01)

(58) Field of Classification Search
None
See application file for complete search history.

(56) References Cited

U.S. PATENT DOCUMENTS 2,771,744 A 11/1956 Johnson et al.
3,703,259 A * 11/1972 Sturgess .................. F23D 11/10
239/400

(Continued)

FOREIGN PATENT DOCUMENTS

CN 101818909 A 9/2010
CN 101932881 A 12/2010

(Continued)

OTHER PUBLICATIONS

PCT/RU2014/000333 International Search Report dated Feb. 3, 2015.

(Continued)

*Primary Examiner* — Steven M Sutherland
*Assistant Examiner* — Rodolphe Andre Chabreyrie
(74) *Attorney, Agent, or Firm* — Dority & Manning, P.A.

(57) ABSTRACT

A pre-film liquid fuel cartridge (20) includes a primary liquid fuel passage (106), a plurality of inner fuel ports (116) and a plurality of outer fuel ports (124) that are in fluid communication with the primary liquid fuel passage. An inner pre-filming surface (142) is defined downstream from the plurality of inner fuel ports. The inner pre-filming surface (142) terminates at a first shear edge (140). An outer pre-filming surface (152) is defined downstream from the plurality of outer fuel ports. The outer pre-filming surface (152) terminates at a second shear edge (154). The first and second shear edges are relatively oriented so that a first pre-filmed liquid fuel sheet exiting the first shear edge intersects with a second pre-filmed liquid fuel sheet exiting the second shear edge, thereby atomizing the first and second pre-filmed liquid fuel sheets.

20 Claims, 10 Drawing Sheets

(56) References Cited

U.S. PATENT DOCUMENTS

| | | |
|---|---|---|
| 4,139,157 A | 2/1979 | Simmons |
| 4,361,285 A | 11/1982 | Koppehele et al. |
| 4,798,330 A | 1/1989 | Mancini et al. |
| 6,189,314 B1* | 2/2001 | Yamamoto ............... F23R 3/12 60/737 |
| 2005/0133642 A1 | 6/2005 | Rackwitz |
| 2010/0263382 A1 | 10/2010 | Mancini et al. |
| 2013/0025285 A1* | 1/2013 | Stewart ............... F02C 7/2365 60/740 |
| 2013/0167544 A1* | 7/2013 | Nickolaus ............... F23R 3/286 60/772 |
| 2014/0116054 A1 | 5/2014 | Means et al. |

FOREIGN PATENT DOCUMENTS

| | | |
|---|---|---|
| CN | 103459928 A | 12/2013 |
| EP | 1793165 A2 | 6/2007 |
| JP | 2009198054 A | 9/2009 |
| WO | WO 2013/115671 A1 | 8/2013 |

OTHER PUBLICATIONS

Office Action issued in related Chinese Application No. 201480078815.X dated Jul. 18, 2018.

\* cited by examiner

//(1)

PRE-FILM LIQUID FUEL CARTRIDGE

FIELD OF THE INVENTION

The present invention generally involves a pre-film liquid fuel cartridge for a combustor of a gas turbine. Specifically, the invention relates to a pre-film liquid fuel cartridge having intersecting liquid fuel sheets for atomizing a liquid fuel within the combustor prior to combustion.

BACKGROUND OF THE INVENTION

A combustor for a gas turbine may be configured or designed to combust liquid fuels, gaseous fuels or both within a combustion chamber. Pre-filming air-blast liquid fuel injectors for issuing atomized liquid fuel into the combustion chamber of the combustor are well known in the art. In this type of fuel injector, fuel is spread out into a thin continuous sheet and then subjected to a stream of atomizing air.

In one configuration, the atomizing air flows through concentric air swirl passages that generate separate swirling airflows at the nozzle exit. At the same time, liquid fuel flows through a plurality of circumferentially arranged ports and then onto a single or common pre-filming surface where it spreads out into a thin uniform sheet before being discharged from the edge of the pre-filming surface into the cross-flowing air stream. When the fuel is injected into the combustion chamber for combustion, high temperature regions are formed locally in the combustion gas, which increase NOx emissions. The enhanced mixing of the fuel-air combination from the fuel nozzle with the swirling fuel-air mixture in the combustion chamber reduces peak flame temperature within the combustion chamber, thereby reducing NOx emission levels. In addition, water may be injected into the combustion chamber to further reduce cool the flame temperature, thus further reducing NOx emissions levels.

The use of atomizing air to shear the liquid fuel reduces the volume of air that is utilized for other purposes such as cooling the combustor and/or other parts of the gas turbine, thereby affecting the overall efficiency of the gas turbine. In addition, a large volume of water must be supplied at a sufficiently high pressure in order to have sufficient kinetic energy to interacting with the fuel and the atomizing air. This requires high pressure pumps which may also affect the overall efficiency of the gas turbine. Furthermore, use of the atomizing air to atomize the liquid fuel may result in relatively large droplets of fuel that may collect or wet on an inner surface of the combustion liner, thus potentially resulting in spallation and/or degradation of a thermal barrier coating that is typically disposed along the inner surface. Therefore, an improved pre-film liquid fuel cartridge for a combustor of a gas turbine would be useful.

BRIEF DESCRIPTION OF THE INVENTION

Aspects and advantages of the invention are set forth below in the following description, or may be obvious from the description, or may be learned through practice of the invention.

One embodiment of the present invention is a pre-film liquid fuel cartridge. The pre-film liquid fuel cartridge includes a primary liquid fuel passage, a plurality of inner fuel ports and a plurality of outer fuel ports that are in fluid communication with the primary liquid fuel passage. An inner pre-filming surface is defined downstream from the plurality of inner fuel ports. The inner pre-filming surface terminates at a first shear edge. An outer pre-filming surface is defined downstream from the plurality of outer fuel ports. The outer pre-filming surface terminates at a second shear edge. The first and second shear edges are relatively oriented so that a first pre-filmed liquid fuel sheet exiting the first shear edge intersects with a second pre-filmed liquid fuel sheet exiting the second shear edge, thereby atomizing the first and second pre-filmed liquid fuel sheets.

Another embodiment of the present disclosure is a pre-film liquid fuel cartridge. The pre-filmed liquid fuel cartridge includes a fluid conduit that at least partially defines a primary liquid fuel passage therein. An injection tip extends radially and circumferentially across a downstream end of the fluid conduit. The injection tip at least partially defines a plurality of inner fuel ports and a plurality of outer fuel ports that are in fluid communication with the primary liquid fuel passage. The pre-film fuel cartridge includes a pre-film tip having a forward end that is proximate to the fuel injection tip and an aft end that is disposed axially downstream from the forward end. The pre-film tip includes an outer side that defines an inner pre-filming surface and a first shear edge that is defined at the aft end. The plurality of inner fuel ports is oriented to direct a first portion of a liquid fuel from the primary fuel passage onto the inner pre-filming surface. A pre-film collar extends circumferentially around the fluid conduit and the pre-film tip. The pre-film collar includes an inner side that at least partially defines an outer pre-filming surface and a second shear edge that is defined at a downstream end of the pre-film collar. The plurality of outer fuel ports is oriented to direct a second portion of the liquid fuel onto the outer pre-filming surface. The first and second shear edges are relatively oriented so that a first pre-filmed liquid fuel sheet exiting the first shear edge intersects with a second pre-filmed liquid fuel sheet exiting the second shear edge, thereby atomizing the first pre-filmed liquid fuel sheet and the second pre-filmed liquid fuel sheet for combustion.

Another embodiment of the present disclosure includes a gas turbine. The gas turbine includes a compressor, a combustor disposed downstream from the compressor and a turbine that is disposed downstream from the combustor. The combustor includes a fuel nozzle that extends downstream from an end cover and that defines a fuel cartridge passage within the combustor. A pre-film liquid fuel cartridge extends within the fuel cartridge passage. The pre-film liquid fuel cartridge includes a primary liquid fuel passage, a plurality of inner fuel ports and a plurality of outer fuel ports that are in fluid communication with the primary liquid fuel passage. An inner pre-filming surface is defined downstream from the plurality of inner fuel ports. The inner pre-filming surface terminates at a first shear edge. An outer pre-filming surface is defined downstream from the plurality of outer fuel ports. The outer pre-filming surface terminates at a second shear edge. The first and second shear edges are relatively oriented so that a first pre-filmed liquid fuel sheet exiting the first shear edge intersects with a second pre-filmed liquid fuel sheet exiting the second shear edge, thereby atomizing the first pre-filmed liquid fuel sheet and the second pre-filmed liquid fuel sheet for combustion.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
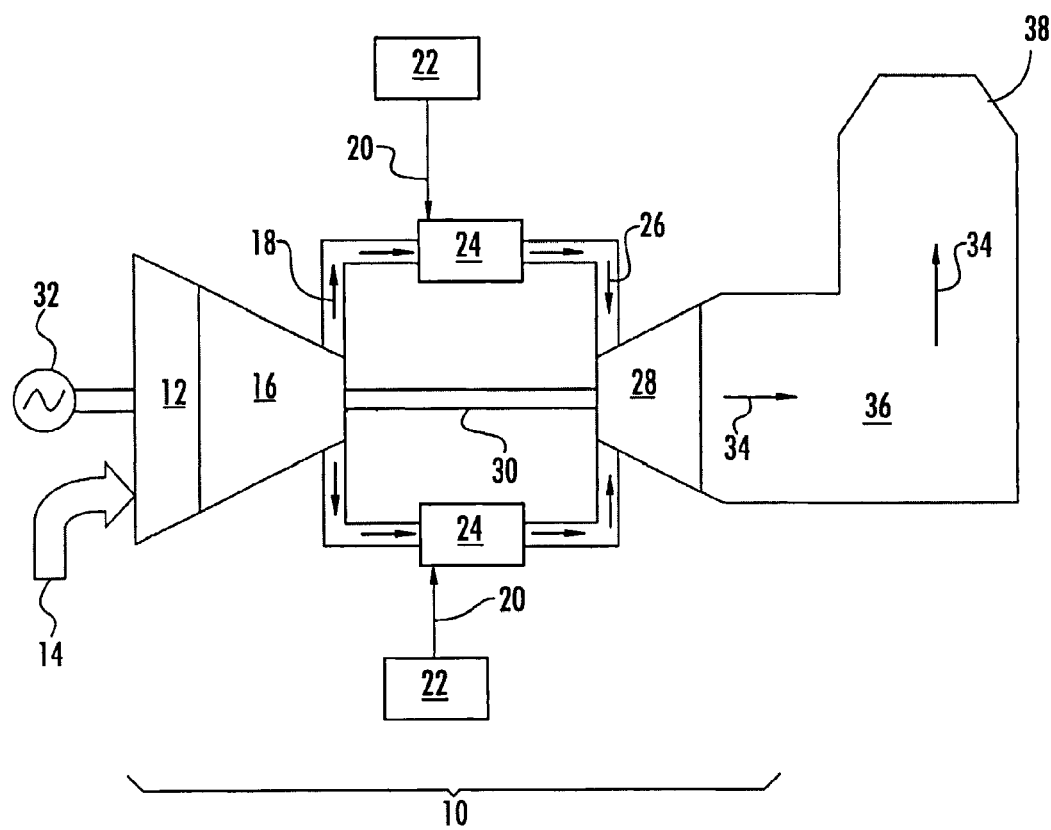
FIG. 1 is a functional block diagram of an exemplary gas turbine that may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of a pre-film liquid fuel cartridge incorporated into a can type combustor of an industrial gas turbine for purposes of illustration, one of ordinary skill in the art will readily appreciate that embodiments of the present invention may be applied to any combustor type such as but not limited to a can annular type combustor and may be incorporated into any turbomachine such as a marine or aircraft gas turbine and are not limited to an industrial gas turbine combustor unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel source 22 such as a fuel skid to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 that is downstream from the turbine 28. The exhaust section 36 may include, for example, a heat recovery steam generator (not shown) for cleaning and extracting additional heat from the exhaust gases 34 prior to release to the environment.

Figure 2:
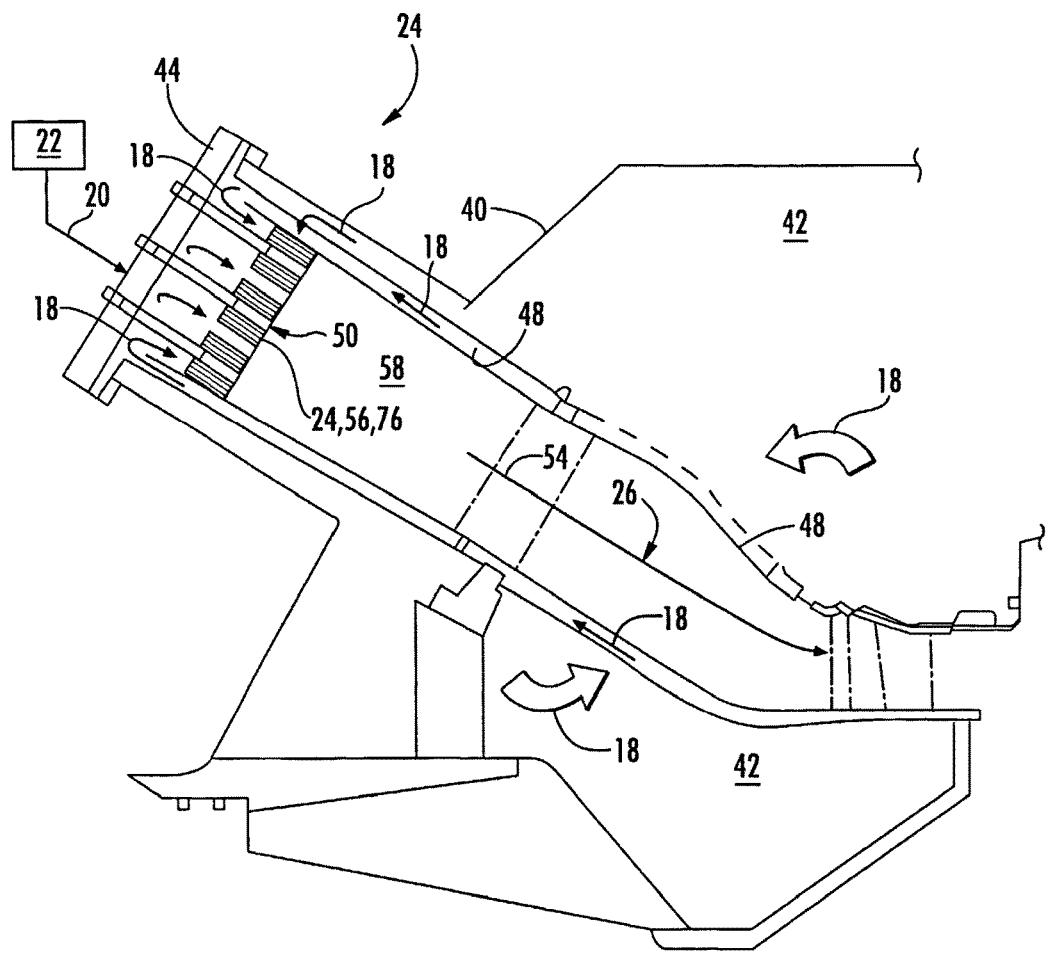
FIG. 2 is a simplified cross-section side view of an exemplary combustor as may incorporate various embodiments of the present invention.

FIG. 2 provides a simplified cross section of an exemplary combustor 24 as may incorporate various embodiments of the present invention. As shown, the combustor 24 is at least partially surrounded by an outer casing 40. The outer casing 40 at least partially forms a high pressure plenum 42 around the combustor 24. The high pressure plenum 42 may be in fluid communication with the compressor 16 or other source for supplying the compressed working fluid 18 to the combustor 24. In one configuration, an end cover 44 is coupled to the outer casing 40. The end cover 44 may be in fluid communication with the fuel supply 22.

As shown in FIG. 2, one or more fuel nozzles 46 extend downstream from the end cover in a substantially axial direction with respect to an axial centerline of the combustor 24. The fuel nozzles 46 receive fuel directly from the fuel supply 22 and/or via the end cover 44. One end of an annular liner 48 such as a combustion liner and/or a transition duct surrounds a downstream end 50 of the fuel nozzles so as to at least partially define a combustion chamber 52 within the combustor 24. The liner 48 at least partially defines a hot gas path 54 for directing the combustion gases 26 from the combustion chamber 52 through the combustor 24. For example, the hot gas path 54 may be configured to route the combustion gases 26 towards the turbine 28 and/or the exhaust section 36 (FIG. 1).

Figure 3:
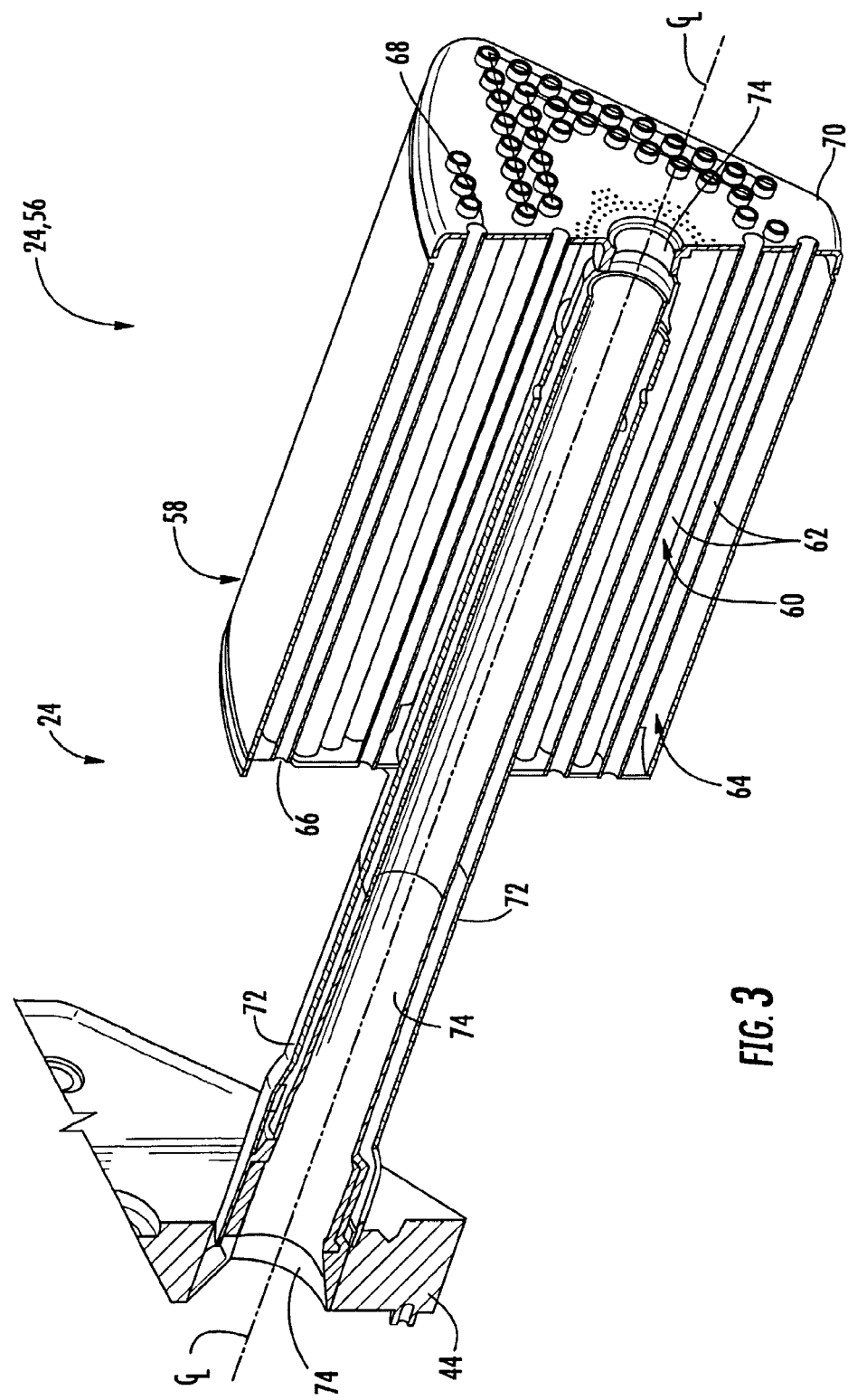
FIG. 3 is an enlarged perspective view of a portion of an exemplary combustor according to one embodiment of the present invention.

FIG. 3 is an enlarged perspective view of a portion of an exemplary combustor 24 according to one embodiment of the present invention. Although the combustor is shown and described herein as a "can type" combustor, the present invention is not limited to a "can type" combustor unless specifically recited in the claims. For example, the combustor may be a can-annular, annular or other type of combustor. In one embodiment, as shown in FIG. 3, the fuel nozzle 46 may include at least one bundled tube fuel injector 56. The bundled tube fuel injector 56 generally includes a fuel distribution module 58, a compressed air plenum 60 and a plurality of pre-mix tubes 62 that extend axially through the fuel distribution module 58 and the compressed air plenum 60. The fuel distribution manifold 58 includes a fuel plenum 64 that is in fluid communication with the fuel supply 22 and/or the end cover 44. Each pre-mix tube 62 generally includes an inlet 66 disposed upstream from the fuel distribution module 58 and an outlet 68 disposed downstream from an effusion or cap plate 70. The premix tubes 62 are in fluid communication with the high pressure plenum 42 (FIG. 2) via the inlet 66 and the fuel plenum 64 via a plurality of fuel ports (not shown). Liquid fuel and a portion of the compressed air 18 combine within the premix tubes 62, thus providing a lean fuel-air combustible mixture to the combustion chamber 52.

In one embodiment, a fluid conduit 72 provides for fluid communication between the fuel plenum 64 and the end cover 44 and/or the fuel supply 22 (FIG. 2). In one embodiment, the fluid conduit 72 at least partially defines a fuel cartridge passage 74 that extends through the bundled tube fuel injector 56 including the effusion or cap plate 70. In particular embodiments, the end cover 44 at least partially defines the fuel cartridge passage 74.

Figure 4:
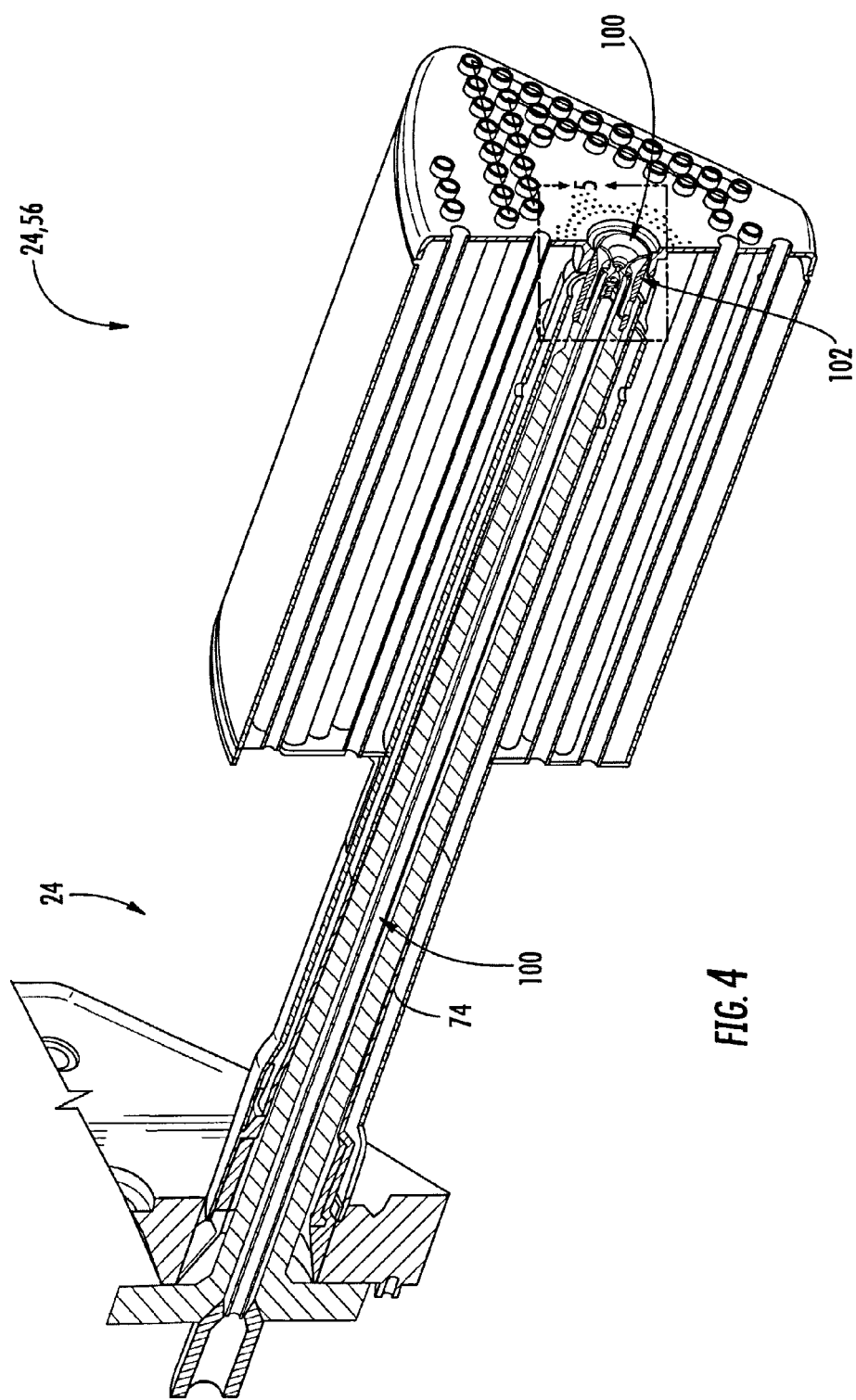
FIG. 4 is a partial cross sectional perspective view of a bundled tube fuel injector including a pre-film liquid fuel cartridge according to one embodiment of the present invention.
Figure 5:
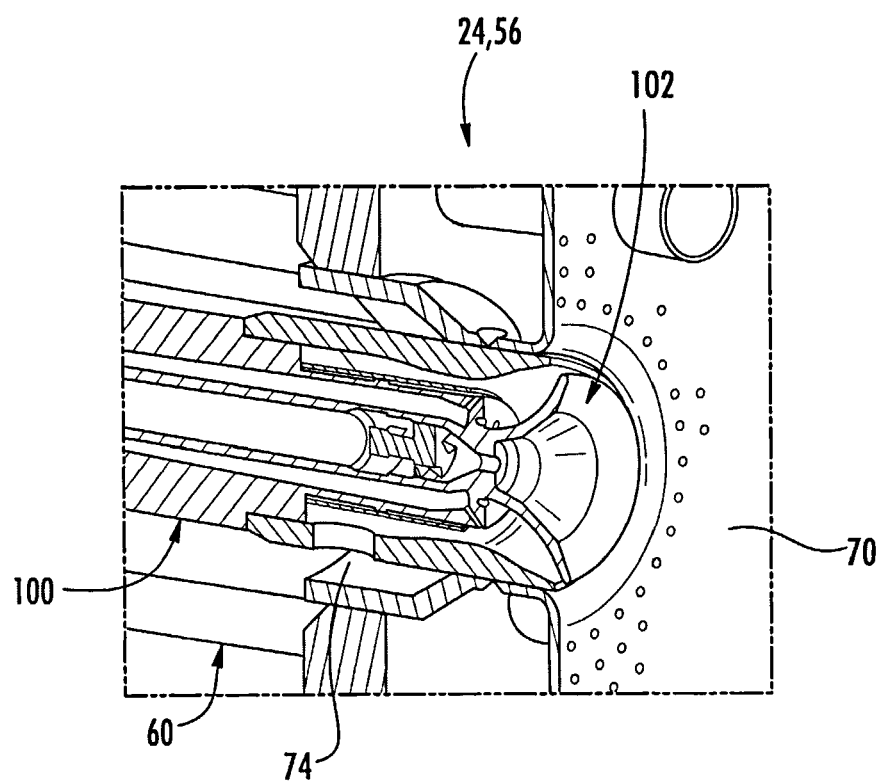
FIG. 5 is an enlarged perspective view of a portion of the bundled tube fuel injector as shown in FIG. 4 including a downstream end portion of the pre-film liquid fuel cartridge, according to one embodiment of the present invention.

FIG. 4 provides a partial cross sectional perspective view of the bundled tube fuel injector 56 as shown in FIG. 3 including a pre-film liquid fuel cartridge 100 according to one embodiment of the present invention. FIG. 5 is an enlarged perspective view of a portion of the bundled tube fuel injector 56 as shown in FIG. 4 including a downstream end portion 102 of the pre-film liquid fuel cartridge 100 according to one embodiment of the present invention. As shown in FIG. 4 the pre-film liquid fuel cartridge may be breach loaded into the fuel cartridge passage 74 via the end cover 44. As shown in FIGS. 4 and 5, the downstream end portion 102 of the pre-film liquid fuel cartridge 100 extends at least partially through the effusion or cap plate 70 to provide for fluid communication into the combustion chamber 52 (FIG. 2).

Figure 6:
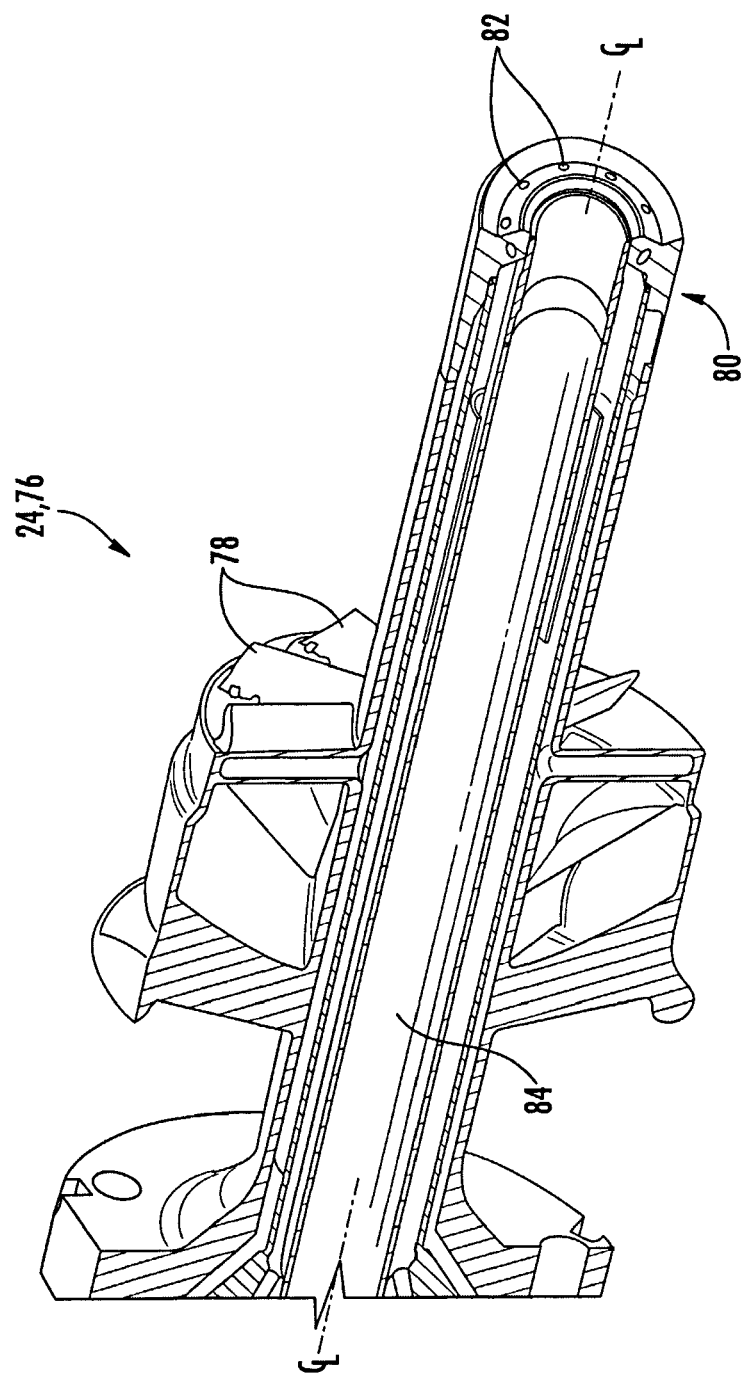
FIG. 6 is a cross sectional perspective view of an exemplary premix fuel nozzle according to one embodiment of the present invention.

FIG. 6 provides a cross sectional perspective view of an exemplary fuel nozzle 46 according to one embodiment of the present invention. As shown in FIG. 6, the fuel nozzle 46 may include a premix fuel injector 76 having a plurality of swirler vanes 78 that extend radially outwardly and axially with respect to an axial centerline of the premix fuel injector 76. A tip portion 80 or downstream end of the premix fuel injector 76 includes a plurality of annularly arranged fuel ports 82. The premix fuel injector 76 at least partially defines a fuel cartridge passage 84 that extends axially through the premix fuel injector 76.

Figure 7:
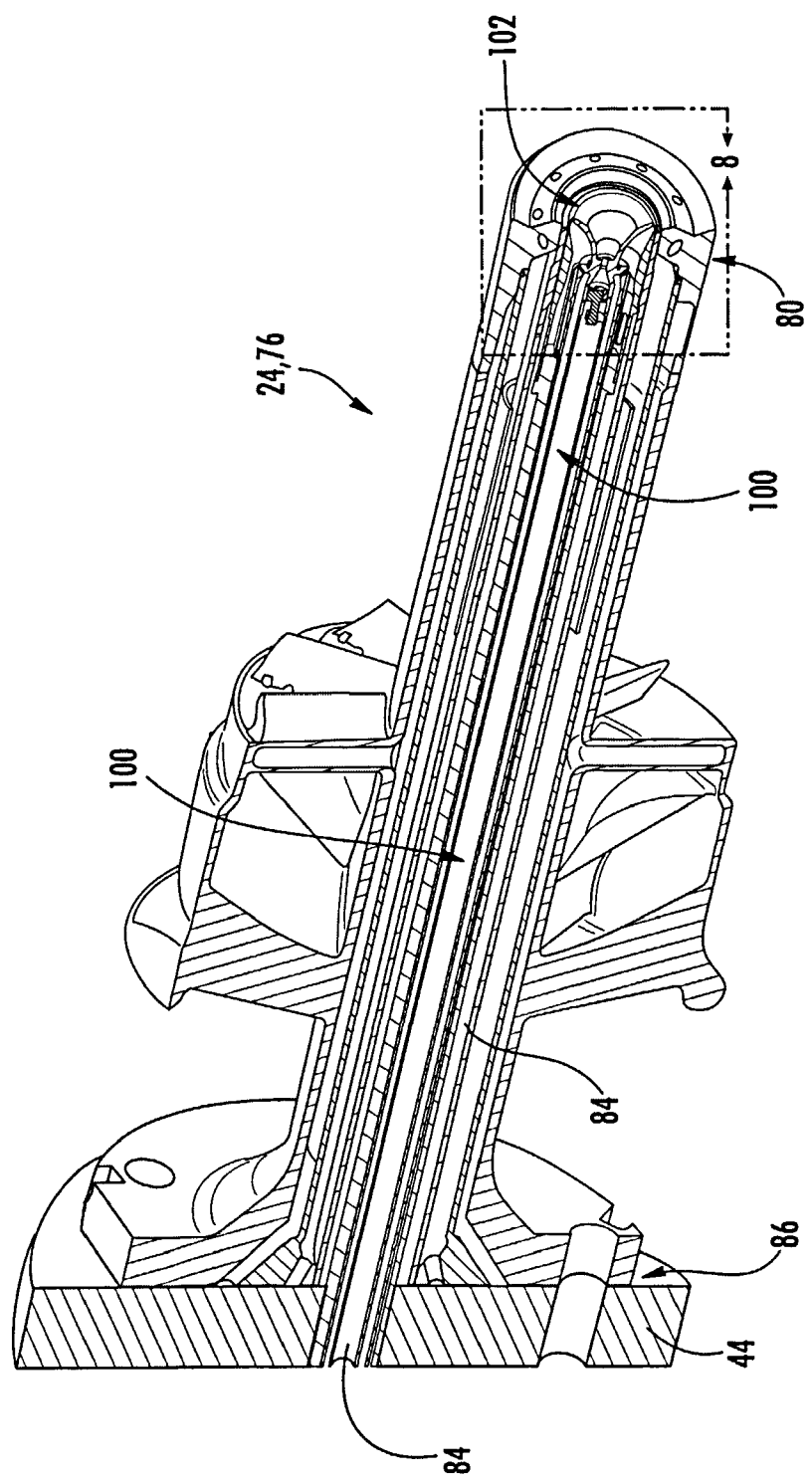
FIG. 7 is a partial cross sectional perspective view of the premix fuel nozzle as shown in FIG. 6 including the pre-film liquid fuel cartridge, according to one embodiment of the present invention.
Figure 8:
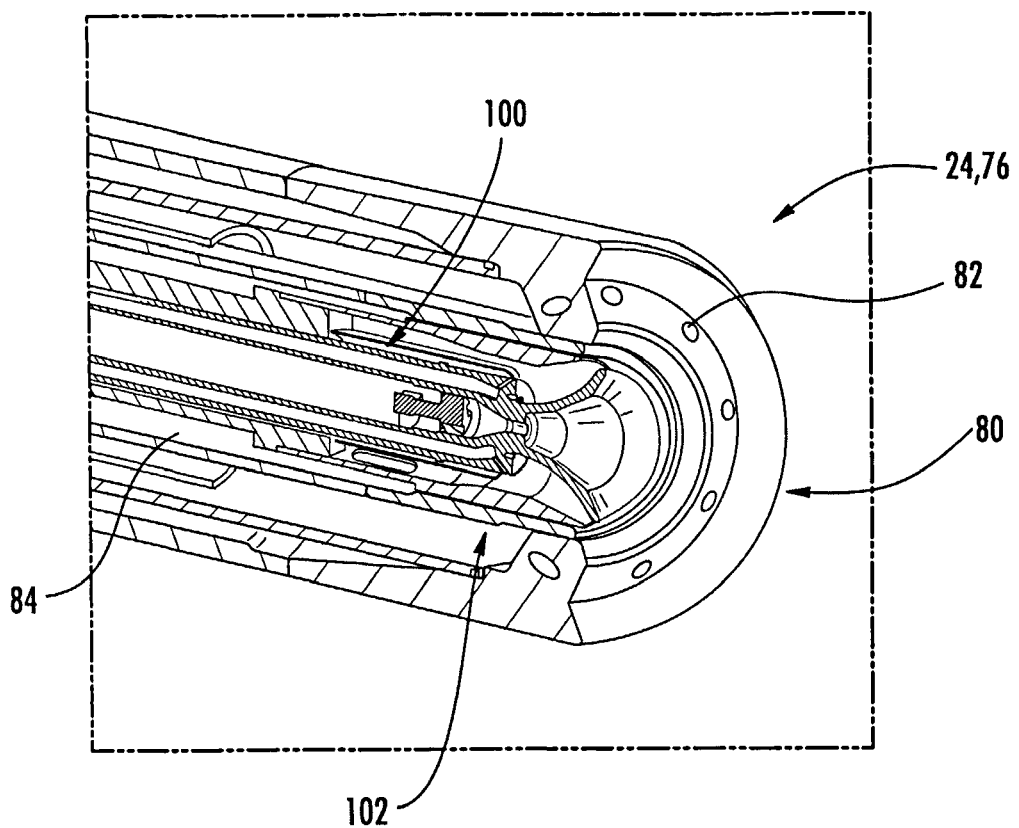
FIG. 8 is an enlarged perspective view of a portion of the premix fuel injector as shown in FIG. 7 including the downstream end portion of the pre-film liquid fuel cartridge, according to one embodiment of the present invention.

FIG. 7 provides a partial cross sectional perspective view of the premix fuel injector 76 as shown in FIG. 6 including the pre-film liquid fuel cartridge 100 according to one embodiment of the present invention. FIG. 8 is an enlarged perspective view of a portion of the premix fuel injector 76 as shown in FIG. 7 including the downstream end portion 102 of the pre-film liquid fuel cartridge 100 according to one embodiment of the present invention. As shown in FIG. 7, an upstream end 86 of the premix fuel injector 76 is configured to mount to the end cover 44 (FIG. 2).

In particular embodiments, as shown in FIG. 7 the end cover 44 at least partially defines the fuel cartridge passage 84. In one embodiment, the pre-film liquid fuel cartridge 100 may be breach loaded into the fuel cartridge passage 84 via the end cover 44. As shown in FIGS. 7 and 8, the downstream end portion 102 of the pre-film liquid fuel cartridge 100 extends at least partially through the tip portion 80 or downstream end of the premix fuel injector 76 to provide for fluid communication into the combustion chamber 52 (FIG. 2).

Figure 9:
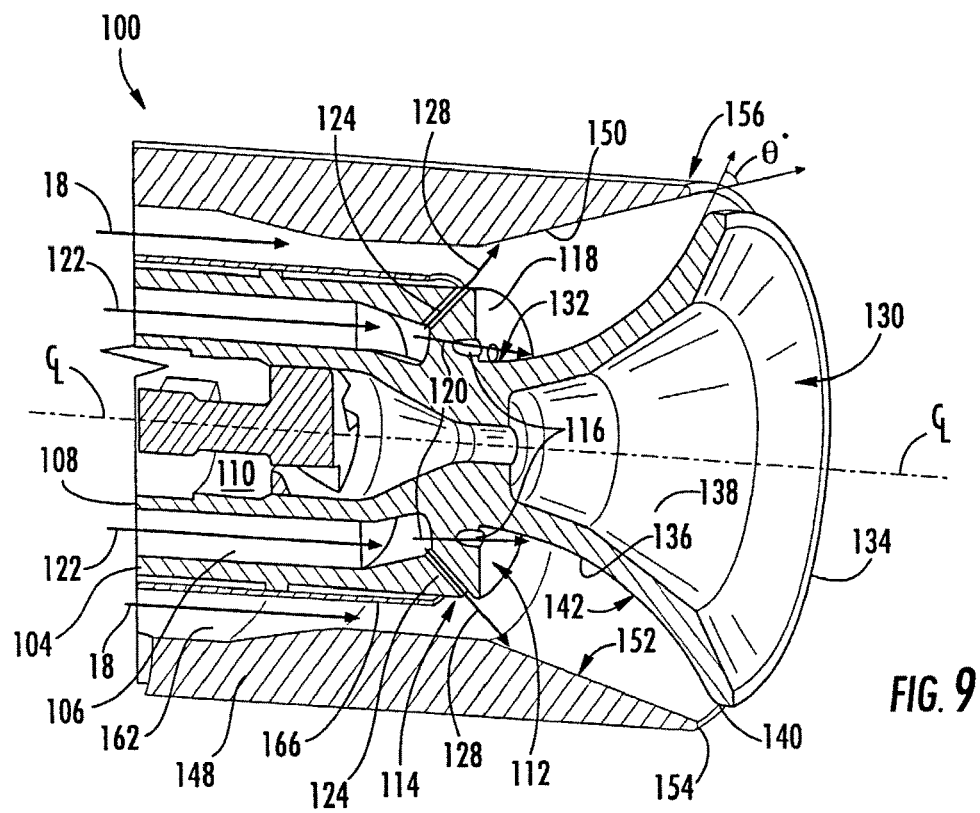
FIG. 9 is an enlarged cross sectional perspective view of the downstream end portion of the pre-film liquid fuel cartridge as shown in FIGS. 5 and 8, according to various embodiments of the present invention.

FIG. 9 is an enlarged cross sectional perspective view of the downstream end portion 102 of the pre-film liquid fuel cartridge 100 as shown in FIGS. 5 and 8, according to various embodiments of the present invention. As shown in FIG. 9, the pre-film liquid fuel cartridge 100 includes a fluid conduit 104 that at least partially defines a primary liquid fuel passage 106 therein. In one embodiment, the primary liquid fuel passage 106 is at least partially defined between the fluid conduit 104 and an inner tube 108 that is coaxially aligned with the fluid conduit 104 and that extends substantially axially therein. The primary liquid fuel passage 106 is in fluid communication with a liquid fuel supply (not shown). In one embodiment, the inner tube 108 at least partially defines a secondary or pilot liquid fuel/water passage 110 within the fluid conduit 104. The secondary or pilot liquid fuel passage 110 may be in fluid communication with a liquid fuel supply and/or a water or compressed air supply.

Figure 10:
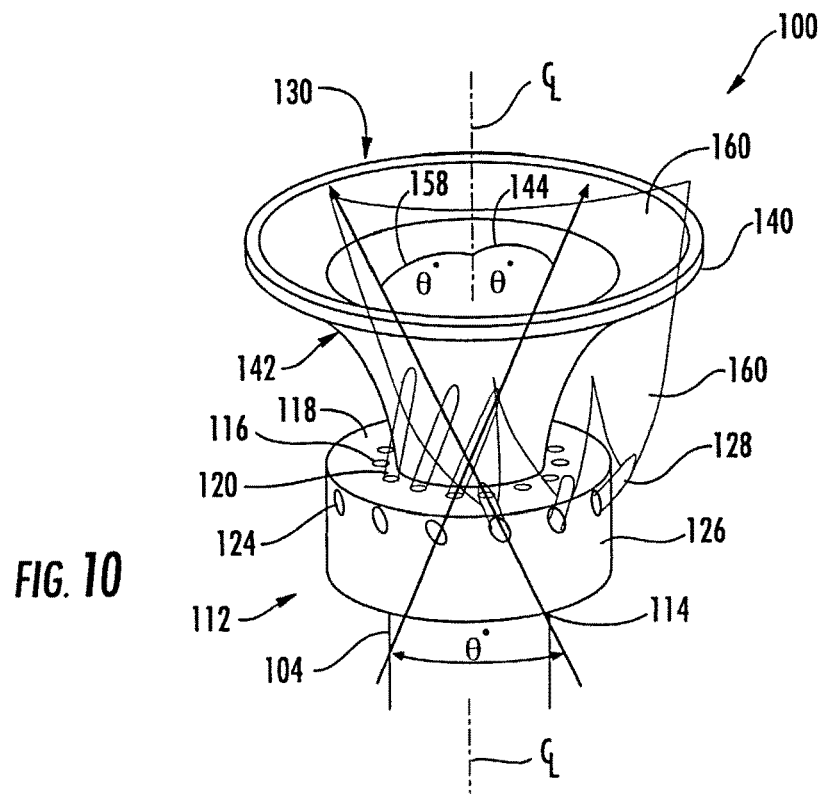
FIG. 10 is a side perspective view of a portion of the pre-mix liquid fuel cartridge as shown in FIG. 9, according to one embodiment of the present invention.

FIG. 10 is a side perspective view of a portion of the pre-mix liquid fuel cartridge 100 as shown in FIG. 9, according to one embodiment of the present invention. In one embodiment, as shown in FIGS. 9 and 10, the pre-film liquid fuel cartridge 100 includes an injection tip 112. The injection tip 112 extends radially and circumferentially across at least portion of a downstream end 114 of the fluid conduit 104. A plurality of inner fuel ports 116 are annularly arranged across a downstream or aft side 118 of the injection tip 112. The inner fuel ports 116 are in fluid communication with the primary liquid fuel passage 106 (FIG. 9). In particular embodiments, the inner fuel ports 116 provide for fluid communication from the primary liquid fuel passage 106 through the downstream or aft side 118. In one embodiment, As shown in FIG. 10, the inner fuel ports 116 are oriented to direct a flow of a first portion 120 of a liquid fuel 122 from the primary liquid fuel passage 106 (FIG. 9) in a generally radially inwardly direction with respect to the axial centerline of the pre-film liquid fuel cartridge 100.

In one embodiment, as shown in FIGS. 9 and 10, a plurality of outer fuel ports 124 are circumferentially arranged around a radially outer side or perimeter 126 of the injection tip 112. The outer fuel ports 124 are in fluid communication with the primary liquid fuel passage 106 (FIG. 9). In particular embodiments, the outer fuel ports 124 provide for fluid communication from the primary liquid fuel passage 106 (FIG. 9) through the radially outer side 126

(FIG. 10). In one embodiment, as shown in FIGS. 9 and 10, the outer fuel ports 124 are oriented to direct a flow of a second portion 128 of the liquid fuel 122 from the primary fuel passage 106 in a radially outwardly direction with respect to the axial centerline of the pre-film liquid fuel cartridge 100.

In one embodiment, as shown in FIG. 9, the pre-film liquid fuel cartridge 100 includes a pre-film tip 130 having a forward end 132 that is proximate or adjacent to the fuel injection tip 112 and an aft end 134 disposed axially downstream from the forward end 126. The pre-film tip 130 includes an outer side 136, an inner side 138 and a first shear edge 140 defined along or proximate to the aft end 134. In one embodiment, the outer side 136 at least partially defines an inner pre-filming surface 142 disposed downstream from the inner fuel ports 116 and that terminates at the first shear edge 140. In one embodiment, the inner pre-filming surface 142 is arcuate. In one embodiment, the pre-film tip 130 is conical and/or tapers radially outwardly from the forward end 132 towards the aft end 134.

In one embodiment, as shown in FIGS. 9 and 10, the plurality of inner fuel ports 116 are oriented to direct the first portion 120 of the liquid fuel 122 from the primary fuel passage 106 onto the inner pre-filming surface 142 upstream from the first shear edge 140. In one embodiment, as illustrated in FIG. 10, the plurality of inner fuel ports 116 are oriented to provide angular swirl to the first portion 120 of the liquid fuel 122 along the inner pre-filming surface 142. For example, the plurality of inner fuel ports 116 may be set or oriented at a first angle 144 with respect to the axial centerline of the pre-mix liquid fuel cartridge 100. Each inner fuel port 116 may be set or oriented at the same angle or some of the inner fuel ports 116 may be set at different angles. As later illustrated in FIGS. 11 and 12, each inner fuel port 116 provides a discrete first pre-filmed liquid fuel sheet 146 of the first portion 120 of the liquid fuel 122 along the inner pre-filming surface 142.

In one embodiment, as shown in FIG. 9, the pre-film liquid fuel cartridge 100 includes a pre-film collar 148 or sleeve. The pre-film collar 148 extends circumferentially around the fluid conduit 104 and at least a portion of the pre-film tip 130. The pre-film collar 148 includes an inner side 150 defining an outer pre-filming surface 152. The outer pre-filming surface 152 is disposed downstream from the plurality of outer fuel ports 124. The outer pre-filming surface may be arcuate. The pre-film collar 148 further includes a second shear edge 154 defined at a downstream end 156 of the pre-film collar 148. The outer pre-filming surface 152 terminates at the second shear edge 154.

Figure 11:
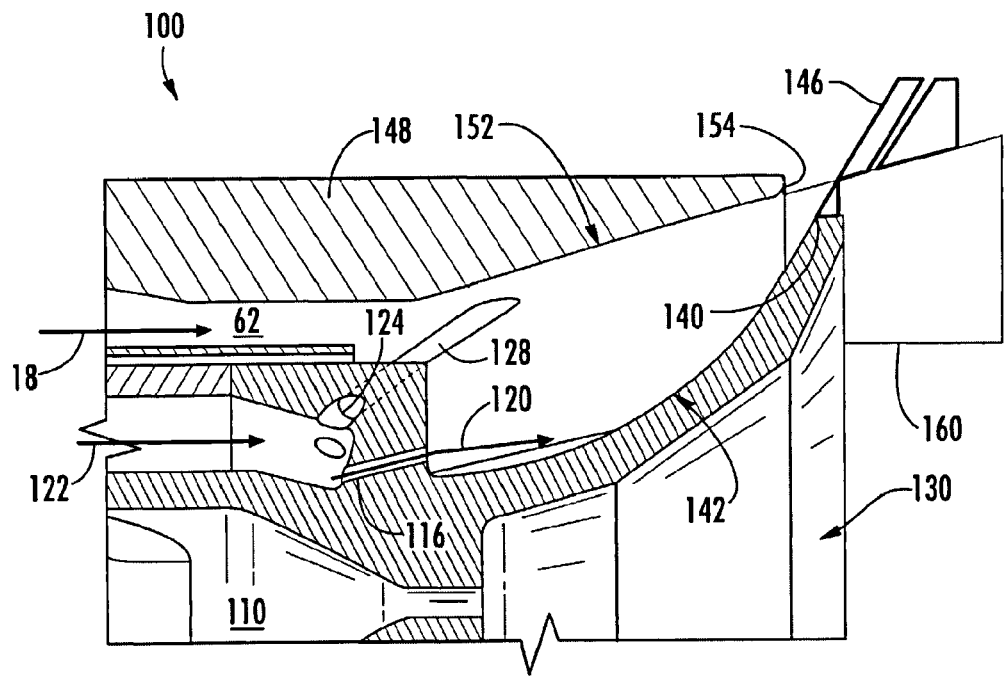
FIG. 11 is a partial cross sectional side view of the pre-filmed liquid fuel cartridge as shown in FIGS. 9 and 10 in operation, according to one or more embodiments of the present invention.
Figure 12:
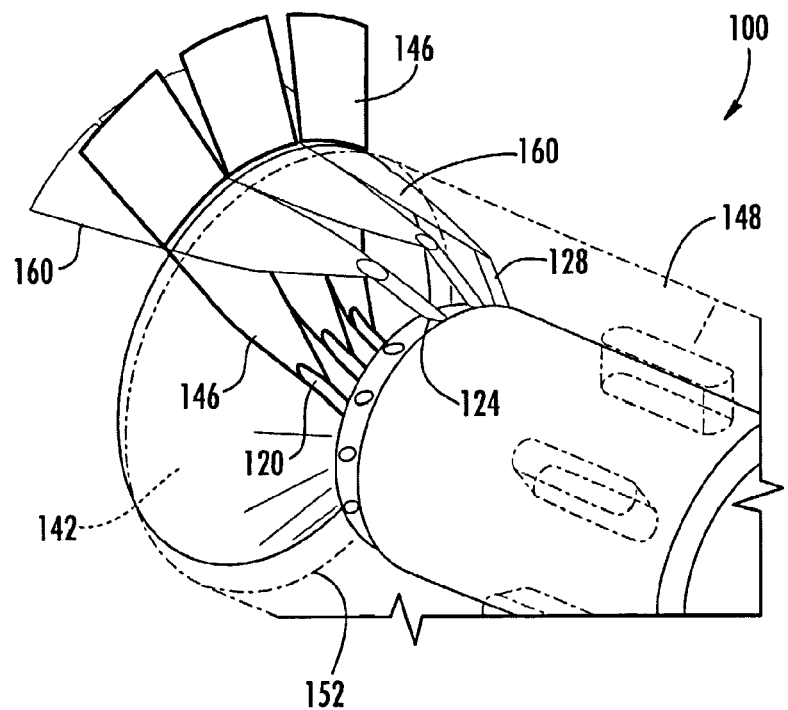
FIG. 12 is a partially transparent perspective view of a portion of the pre-filmed liquid fuel cartridge as shown in FIGS. 9, 10 and 11 in operation, according to one embodiment.

In one embodiment, as shown in FIGS. 9 and 10, the plurality of outer fuel ports 124 are oriented to direct the second portion 128 of the liquid fuel 122 from the primary fuel passage 106 onto the outer pre-filming surface 152 upstream from the second shear edge 154. In one embodiment, as illustrated in FIG. 10, the plurality of outer fuel ports 124 are oriented to provide angular swirl to the second portion 128 of the liquid fuel 122 along the outer pre-filming surface 152. For example, the plurality of outer fuel ports 124 may be set or oriented at a second angle 158 with respect to the axial centerline of the pre-mix liquid fuel cartridge 100. Each outer fuel port 124 may be set or oriented at the same angle or some of the outer fuel ports 124 may be set at different angles. As illustrated in FIGS. 10, 11 and 12, each outer fuel port 124 provides a discrete second pre-filmed liquid fuel sheet 160 of the second portion 128 of the liquid fuel 122 along the outer pre-filming surface 152.

In one embodiment, the pre-film liquid fuel cartridge 100 comprises a compressed air passage 162 defined between the inner pre-filming surface 152 of the pre-film collar 148 and the outer pre-filming surface 142 of the pre-film tip 130. The compressed air passage 160 may be at least partially defined between the pre-film collar 148 and the fluid conduit 104. The compressed air passage 160 is in fluid communication with the compressed air plenum 60 of the bundled tube fuel injector 56 (FIG. 5) and/or the high pressure plenum 42 (FIG. 2) via the premix fuel injector 76 (FIG. 8). In one embodiment, the pre-mix liquid fuel cartridge includes a heat shield or sleeve 166 or barrier disposed between the compressed air passage 162 and the fluid conduit 104. The heat shield 166 extends circumferentially around at least a portion of the fluid conduit 104. The heat shield 166 is radially separated from the fluid conduit 104 to provide an air or thermal gap therebetween, thereby reducing or controlling heat transfer between the compressed air 18 and the liquid fuel 122 within the primary liquid fuel passage 106.

FIG. 11 provides a partial cross sectional side view of the pre-filmed liquid fuel cartridge 100 in operation, according to one or more embodiments. FIG. 12 is a partially transparent perspective view of a portion of the pre-filmed liquid fuel cartridge 100 in operation according to one embodiment. During operation, the first portion 120 of the liquid fuel 122 is directed from the inner fuel ports 116 onto the inner pre-filming surface 142 and the second portion 128 of the liquid fuel 122 is directed from the outer fuel ports 124 onto the outer pre-filming surface 152. A relatively small portion of the compressed air 18 may be routed through the compressed air passage 162 between the first pre-filmed liquid fuel sheet 146 and the second pre-filmed liquid fuel sheet 160 to film or push the first and second portions 120, 128 of the liquid fuel 122 across the inner and outer pre-filming surfaces 142, 152. In particular embodiments, the liquid fuel 122 may be mixed with water to reduce flame temperatures, thus reducing NOx emissions.

As the first pre-filmed liquid fuel sheet 146 and the second pre-filmed liquid fuel sheet 160 flows across the first shear edge 140 and the second shear edge 154 respectfully, partial atomization of the liquid fuel sheets 146, 160 may occur. As shown in FIG. 11, the first shear edge 140 and the second shear edge 154 are relatively oriented so that the first pre-filmed liquid fuel sheet 146 exiting the first shear edge 140 intersects with the second pre-filmed liquid fuel sheet 160 exiting the second shear edge 154. For example, the first shear edge 140 and the second shear edge 154 may be oriented at a relative angle 164. As the first pre-filmed liquid fuel sheet 146 and the second pre-filmed liquid fuel sheet 160 intersect, further atomization occurs due to the kinetic energy of each of the first pre-filmed liquid fuel sheet 146 and the second pre-filmed liquid fuel sheet 160.

The various embodiments provided herein, provide various technical advantages over existing pre-film liquid fuel cartridges or fuel injectors. For example, the pre-film liquid fuel cartridge 100 as described herein spatially distributes and atomizes the liquid fuel 122 more efficiently than convention pre-film atomizers with a minimum of compressed air 18 supplied to the pre-film liquid fuel cartridge 100 and at a minimum liquid fuel and/or water pressure, thereby improving the overall efficiency of the gas turbine or power system. Specifically, the pre-film tip as claimed and described herein reduces fuel pressure and reduces parasitic loads on the gas turbine 10 or a combined cycle gas turbine (CCGT), thus resulting in higher net efficiency when compared to combustors having conventional pre-film fuel injectors. Interaction of the first and second liquid fuel sheets 146, 160 and the compressed air 18 facilitate more efficient atomization in spite of a relatively low tip pressure loss and lack of atomizing air. In addition, the pre-film liquid fuel cartridge 100 may be specifically tailored for injecting and atomizing a mixture of two immiscible fluids, namely a liquid fuel known as distillate #2 and water. The pre-film liquid fuel cartridge 100 as described herein avoids applying a high body force to the liquid fuel and water mixture at the intersection of the first and second pre-filmed liquid fuel sheets 146, 160. As a result, the water and liquid fuel remain in close proximity during evaporation and combustion, thereby resulting in a maximum peak flame temperature reduction per unit water injected, and thus, the lowest possible NOx levels at a given combustor exit temperature and water/fuel ratio.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A pre-film liquid fuel cartridge, comprising:
   a fluid conduit defining a primary liquid fuel passage for a liquid fuel;
   an injection tip extending radially and circumferentially across a downstream end of the fluid conduit, the injection tip defining a plurality of inner fuel ports and a plurality of outer fuel ports in fluid communication with the primary liquid fuel passage;
   a pre-film tip having a forward end proximate to the injection tip and an aft end disposed axially downstream from the forward end, the pre-film tip having an outer side defining an inner pre-filming surface downstream from the plurality of inner fuel ports, the inner pre-filming surface terminating at a first shear edge;
   an outer pre-filming surface defined downstream from the plurality of outer fuel ports, the outer pre-filming surface terminating at a second shear edge; and
   wherein the first and second shear edges are relatively oriented so that a first pre-filmed liquid fuel sheet exiting the first shear edge intersects with a second pre-filmed liquid fuel sheet exiting the second shear edge.

2. The pre-film liquid fuel cartridge as in claim 1, further comprising a compressed air passage defined between the inner pre-filming surface and the outer pre-filming surface.

3. The pre-film liquid fuel cartridge as in claim 1, wherein the inner pre-filming surface is arcuate.

4. The pre-film liquid fuel cartridge as in claim 1, wherein the inner pre-film tip is conical.

5. The pre-film liquid fuel cartridge as in claim 1, wherein the plurality of inner fuel ports are oriented to provide angular swirl to the liquid fuel along the inner pre-filming surface.

6. The pre-film liquid fuel cartridge as in claim 1, wherein the plurality of outer fuel ports are oriented to provide angular swirl to the liquid fuel along the outer pre-filming surface.

7. The pre-film liquid fuel cartridge as in claim 1, wherein the plurality of inner fuel ports are oriented to provide swirl to a first portion of the liquid fuel from the primary liquid fuel passage along the inner pre-filming surface in a first rotational direction and the plurality of outer fuel ports are oriented to provide swirl to a second portion of the liquid fuel from the primary fuel passage along the outer pre-filming surface in a second rotational direction, wherein the first rotational direction is counter to the second rotational direction.

8. A pre-film liquid fuel cartridge, comprising:
   a fluid conduit defining a primary liquid fuel passage therein;
   an injection tip extending radially and circumferentially across a downstream end of the fluid conduit, the injection tip defining a plurality of inner fuel ports and a plurality of outer fuel ports in fluid communication with the primary liquid fuel passage;
   a pre-film tip having a forward end proximate to the injection tip and an aft end disposed axially downstream from the forward end, the pre-film tip having an outer side defining an inner pre-filming surface and a first shear edge defined at the aft end, wherein the plurality of inner fuel ports are oriented to direct a first portion of a liquid fuel from the primary fuel passage onto the inner pre-filming surface;
   a pre-film collar extending circumferentially around the fluid conduit and the pre-film tip, the pre-film collar having an inner side defining an outer pre-filming surface and a second shear edge defined at a downstream end of the pre-film collar, wherein the plurality of outer fuel ports are oriented to direct a second portion of the liquid fuel onto the outer pre-filming surface; and
   wherein the first and second shear edges are relatively oriented so that a first pre-filmed liquid fuel sheet exiting the first shear edge intersects with a second pre-filmed liquid fuel sheet exiting the second shear edge.

9. The pre-film liquid fuel cartridge as in claim 8, further comprising a compressed air passage defined between the inner pre-filming surface of the pre-film collar and the outer pre-filming surface of the pre-film tip.

10. The pre-film liquid fuel cartridge as in claim 8, further comprising a pilot liquid fuel passage defined within the fluid conduit radially inwardly from the primary liquid fuel passage.

11. The pre-film liquid fuel cartridge as in claim 8, further comprising a thermal barrier sleeve disposed between an outer surface of the fluid conduit and the inner surface of the pre-film collar, wherein the thermal barrier sleeve is radially separated from the outer surface to form a thermal gap therebetween.

12. The pre-film liquid fuel cartridge as in claim 8, wherein at least one of the inner pre-film surface and the outer pre-film surface is arcuate.

13. The pre-film liquid fuel cartridge as in claim 8, wherein the pre-film tip is conical or bell shaped.

14. The pre-film liquid fuel cartridge as in claim 8, wherein the plurality of inner fuel ports are oriented to provide angular swirl to the first portion of the liquid fuel along the inner pre-filming surface.

15. The pre-film liquid fuel cartridge as in claim 8, wherein the plurality of outer fuel ports are oriented to provide angular swirl to the second portion of the liquid fuel along the outer pre-filming surface.

16. The pre-film liquid fuel cartridge as in claim 8, wherein the plurality of inner fuel ports are oriented to provide angular swirl to the first portion of the liquid fuel along the inner pre-filming surface in a first rotational direction and the plurality of outer fuel ports are oriented to provide angular swirl to the liquid fuel along the outer pre-filming surface in a second rotational direction, wherein the first rotational direction is counter to the second rotational direction.

17. A gas turbine, comprising:
a compressor;
a combustor disposed downstream from the compressor and a turbine disposed downstream from the combustor, the combustor including a fuel nozzle extending downstream from an end cover, the fuel nozzle defining a fuel cartridge passage;
a pre-film liquid fuel cartridge extending within the fuel cartridge passage, the pre-film liquid fuel cartridge comprising: a fluid conduit defining a primary liquid fuel passage therein; an injection tip extending radially and circumferentially across a downstream end of the fluid conduit, the injection tip defining a plurality of inner fuel ports and a plurality of outer fuel ports in fluid communication with the primary liquid fuel passage;
a pre-film tip having a forward end proximate to the injection tip and an aft end disposed axially downstream from the forward end, the pre-film tip having an outer side defining an inner pre-filming surface downstream from the plurality of inner fuel ports, the inner pre-filming surface terminating at a first shear edge; an outer pre-filming surface defined downstream from the plurality of outer fuel ports, the outer pre-filming surface terminating at a second shear edge; and wherein the first and second shear edges are relatively oriented so that a first pre-filmed liquid fuel sheet exiting the first shear edge intersects with a second pre-filmed liquid fuel sheet exiting the second shear edge.

18. The gas turbine as in claim 17, wherein the fuel nozzle comprises a bundled tube fuel injector having a fuel module in fluid communication with a fuel supply, a tube bundle in fluid communication with the fuel module and a compressed air plenum defined by an outer shroud surrounding the tube bundle, wherein the fuel cartridge passage extends through the compressed air plenum, and wherein the pre-film liquid fuel cartridge further comprises: a compressed air passage defined between the inner pre-filming surface and the outer pre-filming surface; and wherein the compressed air passage is in fluid communication with the compressed air plenum.

19. The gas turbine as in claim 17, wherein the plurality of inner fuel ports are oriented to provide angular swirl to a first portion of a liquid fuel along the inner pre-filming surface in a first rotational direction and the plurality of outer fuel ports are oriented to provide angular swirl to a second portion of the liquid fuel along the outer pre-filming surface in a second rotational direction, wherein the first rotational direction is counter to the second rotational direction.

20. The gas turbine as in claim 18, wherein the plurality of inner fuel ports are annularly arranged around a first end of the pre-film tip, wherein the outer pre-filming surface and the second shear edge are defined by a pre-film collar that extends circumferentially around the pre-film tip, wherein the compressed air passage is at least partially defined between the pre-film collar and the pre-film tip, and wherein the pre-film tip is conical or bell shaped.

* * * * *